(12) United States Patent
Wu

(10) Patent No.: US 8,042,459 B2
(45) Date of Patent: Oct. 25, 2011

(54) GRILL

(75) Inventor: Chunyu Wu, Fujian (CN)

(73) Assignee: Tsann Kuen (China) Enterprises Co., Ltd., Xiamen, Fujian (CN)

( * ) Notice: Subject to any disclaimer, the term of this patent is extended or adjusted under 35 U.S.C. 154(b) by 402 days.

(21) Appl. No.: 12/360,622

(22) Filed: Jan. 27, 2009

(65) Prior Publication Data

US 2009/0255525 A1    Oct. 15, 2009

(30) Foreign Application Priority Data

Jan. 29, 2008    (CN) .......................... 2008 2 0101321

(51) Int. Cl.
    *B60H 3/00*    (2006.01)
    *A47J 37/07*    (2006.01)
(52) U.S. Cl. ............ 99/482; 99/449; 126/25 R; 219/385
(58) Field of Classification Search .................... 99/324, 99/340, 357, 449, 450, 482; 126/25 R, 41 R; 219/385, 386, 400

See application file for complete search history.

(56) References Cited

U.S. PATENT DOCUMENTS

| 3,757,671 | A | * | 9/1973 | Warshauer et al. | ............ 99/400 |
| 4,334,462 | A | * | 6/1982 | Hefling | ............ 99/385 |
| 4,962,697 | A | * | 10/1990 | Farrar | ............ 99/340 |
| 5,111,802 | A | * | 5/1992 | Lin | ............ 126/25 R |
| 5,865,099 | A | * | 2/1999 | Waugh | ............ 99/340 |
| 6,114,666 | A | * | 9/2000 | Best | ............ 219/411 |
| 6,557,545 | B2 | * | 5/2003 | Williams | ............ 126/25 R |
| 7,301,127 | B1 | * | 11/2007 | Derridinger, Jr. | ............ 219/386 |

* cited by examiner

*Primary Examiner* — Kien Nguyen
(74) *Attorney, Agent, or Firm* — Kening Li; Pinsent Masons LLP

(57) ABSTRACT

A grill with a removable smoker unit comprises a pan, a body, a pan cover, a smoker unit and a socket unit, wherein the smoker unit comprises a smoker box and a heating tube member with two plug terminals. The smoker unit is removably mounted on one side of the body, wherein there is a hole in the pan where the smoker unit inserts into the body, and a removable insulation lid mounted on the hole. The socket unit is mounted in the body, and provides electrical connection. The socket unit has holes for receiving the plug terminals. The grill with these structures not only has the conventional functions, but also provides an optional smoking function.

8 Claims, 7 Drawing Sheets

GRILL

CROSS REFERENCE TO RELATED APPLICATIONS

The present application claims priority to Chinese Patent Application No. 200820101321.0, filed on Jan. 29, 2008, the entire disclosure of which is incorporated herein by reference for all purposes.

FIELD OF THE INVENTION

The present invention relates to a house-hold appliance, and more particularly to a grill with a removable smoker box.

BACKGROUND OF THE INVENTION

Various means in cooking food are known, for example, frying, boiling, grilling, baking, smoking, steaming, etc., and different cooking means bring different food taste. Household appliances with various functions such as grills had been used in the kitchen. Conventional grills cook food by electric heating, and are advantageous as they are clean, safe, convenient and fast speed, and as a consequence are favored by consumers. The conventional grill has only the grilling function, and usually comprises a pan, a body, a grill lid and electric heating members, the pan mounted on the body, the electric heating members mounted on the bottom of the pan and embedded in the body, the cover used for covering the pan and forming a closed cooking space with the pan.

Therefore, it is readily apparent that there is a need for a multi-functional grill.

SUMMARY OF THE INVENTION

The primary object of the present invention is to provide a grill with a removable smoker unit. Such a grill not only has the conventional functions, but also provides an optional smoking function, and the food grilled by this grill will not only has the prior effect, e.g. taste and flavor, but also has a smoked effect.

These and other objects are achieved by providing a grill comprising a body which on one side has a recess portion; a grill lid; a pan located on the top of the recess portion, wherein the pan comprises a first connecting device disposed on the bottom of the pan; a smoker unit comprising a smoker box and an electric heating unit disposed on the bottom of the smoker box, wherein the electric heating unit comprises a plug terminal member, and the smoker box comprises a second connecting device which can be connected with the first connecting device, and wherein the smoker unit is integrated into the recess portion by the connection of the first and second connecting devices; a socket unit disposed on the inner portion of the recess portion, wherein the pan and the lid form a cavity, and a passage is formed through the pan, cavity and the smoker box.

The first connecting device comprises a sliding-track unit, the second connecting device comprises a flange unit, and the smoker unit is integrated into the recess portion by sliding the flange unit on the sliding-track unit.

The passage has a removable insulation lid disposed on the upper end.

The smoker unit further comprises a handle fixed on the rear side of the smoker box, wherein the rear side is opposite to the side such that the smoker box faces the body when in assembly.

The electric heating unit comprises at least an electric heating tube, two silica caps, and two terminal pins, wherein the electric heating tube is installed inside the bottom portion of the smoker box, the needles of the electric heating tube are arranged towards to the inner portion of the body, the silica caps are mounted on the two ends of the electric heating tube respectively, and the two terminal pins are mounted on the needles.

The socket unit comprises a water proof member, a speaker terminal member, and a socket lid, wherein the water proof member has an aperture member for passing through the plug terminal member, and the body has a slot member for inserting the water proof member and the speaker terminal member respectively, along the moving direction of the plug terminal member inserting into the body. The water proof member is located on the front portion of the slot member and the speaker terminal member on the rear portion of the slot member. The speaker terminal member is arranged towards to the aperture member, the socket lid covers the water proof member and the speaker terminal member, wherein the socket lid is fixedly connected with the body.

The water proof member comprises a water proof base, a water proof lid, a bar, and a spring, wherein the water proof base has a recess for containing the bar, the water proof lid fixedly connected with the water proof base and covering the recess of the water proof base. The water proof base and the water proof lid respectively comprise two channels through the recess of the water proof base, wherein the water proof base comprises a protrusion unit disposed in the central portion of the recess of the water proof base. The bar is mounted on the protrusion unit and can rotate around the water proof base, wherein the bar comprises two wings which can cut off the channels. The recess of the water proof base further comprises a rib unit extending from the inner side wall of the recess for preventing the counter-clockwise rotation of the bar, wherein the bar further comprises a protrusion disposed in the central portion of the bar, the spring is mounted in the cavity formed by the rib unit and the inner wall of the recess of the water proof base, and the two ends of the spring prop up between the protrusion of the bar and the inner wall of the recess of the water proof base, each of the two wings has a ramp respectively.

The sliding-track unit comprise flexible support pieces.

The grill of the present invention has an additional smoking function compared with conventional grills of the prior art. When the electric heating unit of the smoker box is connected to the body, electricity from the socket will heat the charcoal/spice in the smoker box to produce smoke, and the food items in the closed space between the pan and the grill lid will be smoked. The smoker box is for containing the wood chips/charcoal/spice; the handle fixed on the smoker box is for the smoker box to be inserted into the body or taken down, and for heating insulation; the electric heating tube is to transform electrify into heat; and the silicone caps are mounted on the two openings of the electric heating tube for insulation. As a part of the plug terminal, the terminal pins introduce the electrify into the electric heating tube; the water proof lid and the water proof base cooperate to achieve the water proof effect; the bar is for water proofing and preventing the sundries form falling into the apertures; the spring is for repositioning the bar; and the speaker terminal unit connect the power supply. The speaker terminal unit cooperate with the terminal pins; and the flexible support piece is used as a sliding track for the positioning and guiding for the smoker box onto the body.

In use, the smoker unit is integrated into the recess portion by sliding the flange unit on the sliding-track unit. When reaching the predetermined position, the two flanges of the smoker box will be positioned by the flexible support piece. During the process of the smoker box being inserted into the recess, the plug terminals of the smoker box will insert into the holes of the socket unit, when the plug terminals of the smoker box are inserted into the water proof member, the plug terminals will extrude the ramps of the two wings of the bar to let the bar rotate clockwise, then the protrusion of the bar will extrude the spring. When the bar rotate to a position to make the apertures in the water proof base in communication with the channels in the water proof lid, the plug terminals will pass through the apertures of the water proof member and further insert into the opening of the speaker terminals in the rear of the water proof member. When the smoker unit is inserted entirely in the recess of the body, the plug terminals will entirely insert in the speaker terminals as well, therefore electrify will be introduced into the electric heating tube via the speaker terminals and plug terminals, when the electric heating tube will begin to heat the wood chips/charcoal/spice in the box to produce smoke which will enter into the grilling cavity between the pan and the cover through the hole of the pan, thus the food will be smoked to have gold color and have smoke taste.

When smoking is not needed, the smoker unit can be drawn out from the recess of the body by pulling the handle. After that, the plug terminals of the smoker unit will be drawn out form the holes of the socket unit. When the socket terminals leave the holes of the water proof member, the bar will rotate counter-clockwise via the action of the spring until the two sides of the bar are stopped by the ribs of the water proof base. After reposition, the two wings of the bar will re-block between the holes of the water proof base and the holes of the water proof cover, thus preventing the water or the other sundries from dropping into the holes. The insulation lid should be covered on the pan to prevent the outer air from entering into pan to affect the grilling of the food.

The present invention has the following advantages: compared to conventional grills, the grill of the present invention is equipped with a smoker unit and a socket unit, wherein the smoker unit has an upward opening for containing wood chips/charcoal/spice, and the smoker unit comprises a smoker box and an electric heating member with two plug terminals mounted in the bottom of the smoker box for heating the smoker box; one side of the body has a side-opened recess for containing the smoker box, the pan over the recess has a hole for the grilling cavity enclosed by the pan and the cover is in communication with the interior cavity of the smoker box contained in the recess, and a removable lid covered on the holes; two sliding tracks are mounted on the bottom of the pan over the recess of the body. The smoker box has a flange corresponding to sliding tracks in the two sides respectively, the smoker unit is inserted into the recess of the body via the flanges of the two sides sliding through the sliding track; the socket unit is mounted in the body in the inner side of the recess. The socket unit electrically connects the power source in the body, and has holes for receiving the terminals. The grill with these structure not only has the conventional functions, but also provides an optional smoking function, thus the food grilled in this grill will not only has the prior effect, but also has smoked effect.

Preferred embodiments of the present invention will be described in detail with reference to the drawings and examples.

DETAILED DESCRIPTION OF EXEMPLARY EMBODIMENTS

Figure 1:
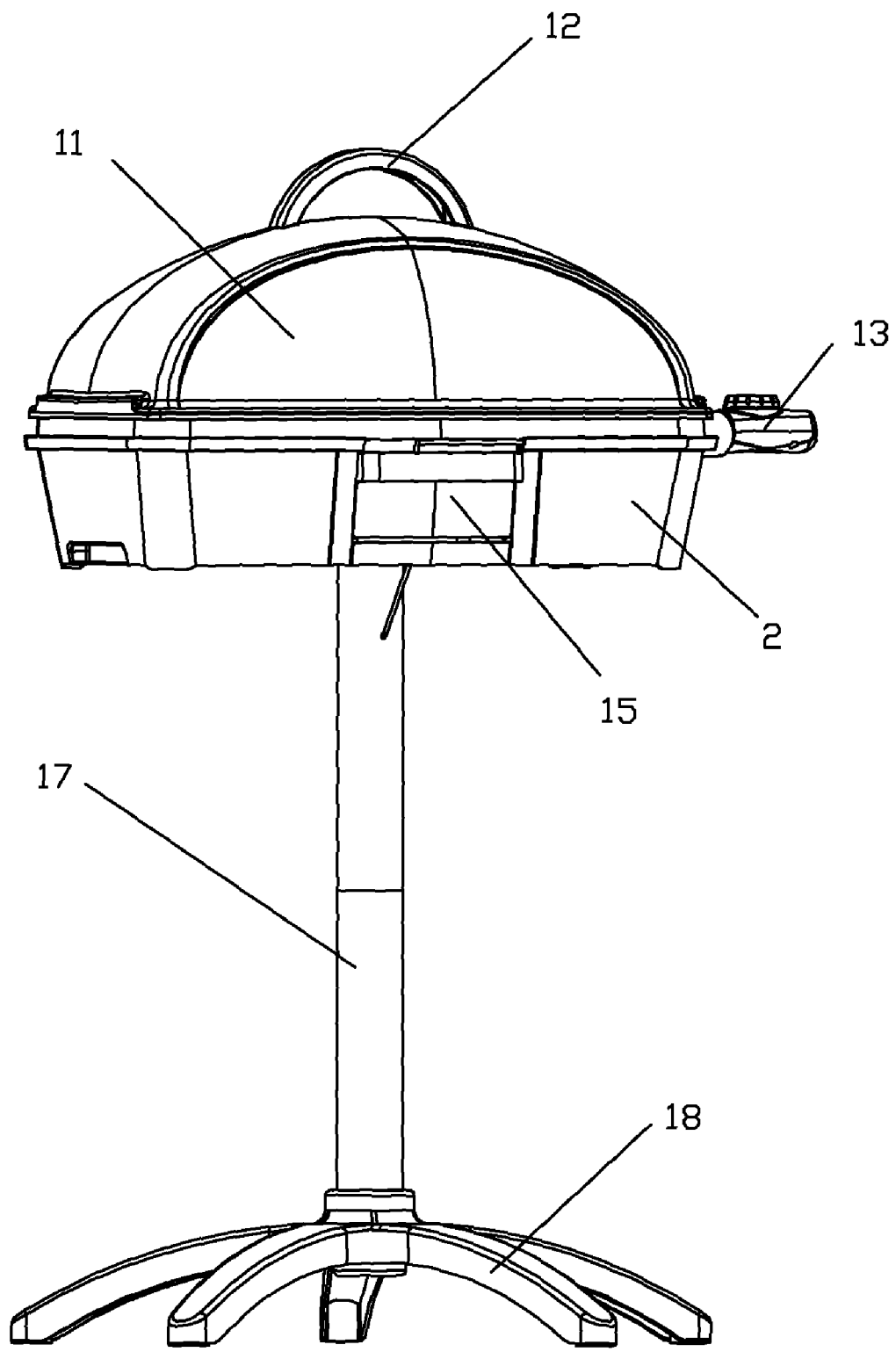
FIG. 1 is a perspective view of the present invention.
Figure 2:
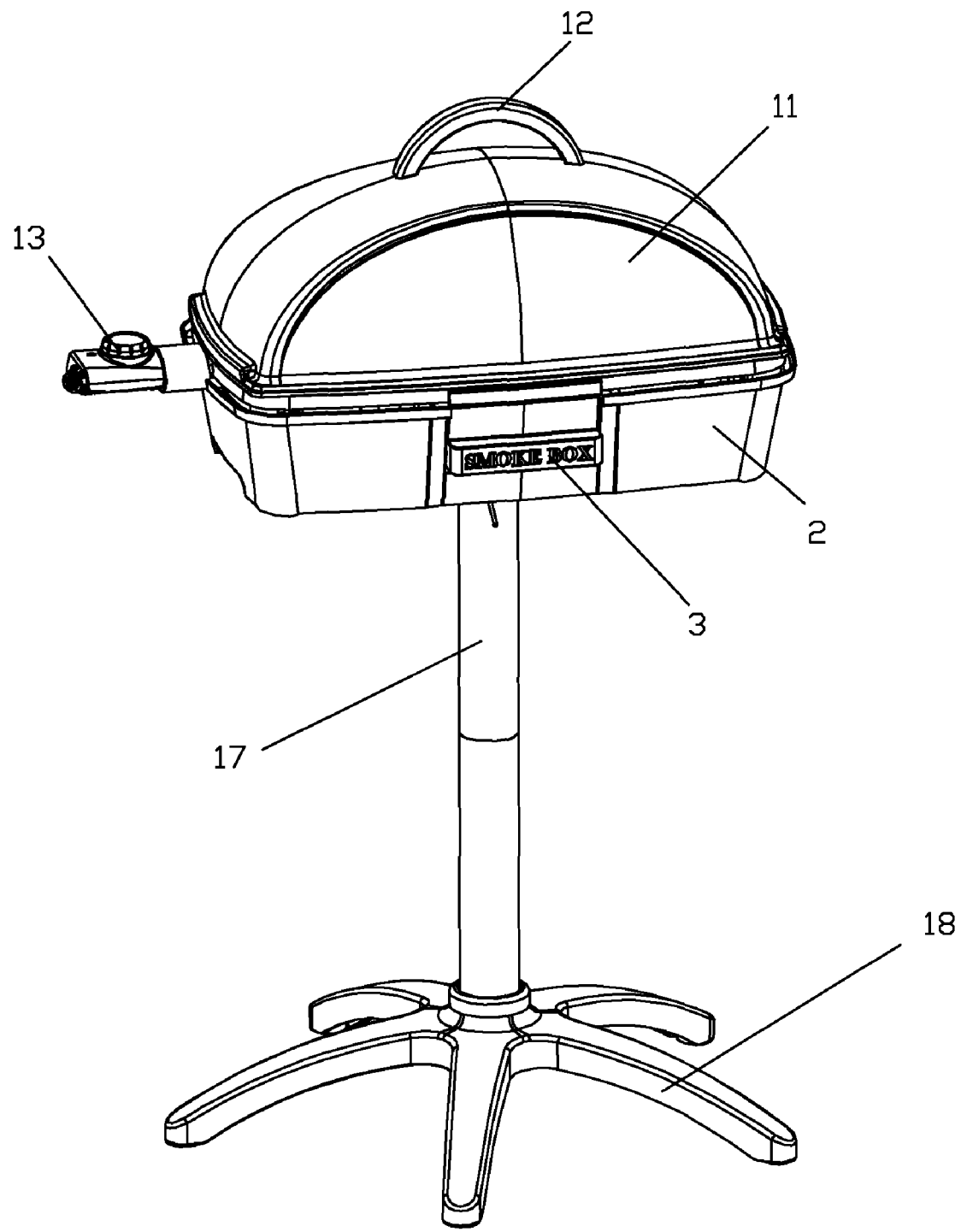
FIG. 2 is a rear side perspective view of the present invention.
Figure 3:
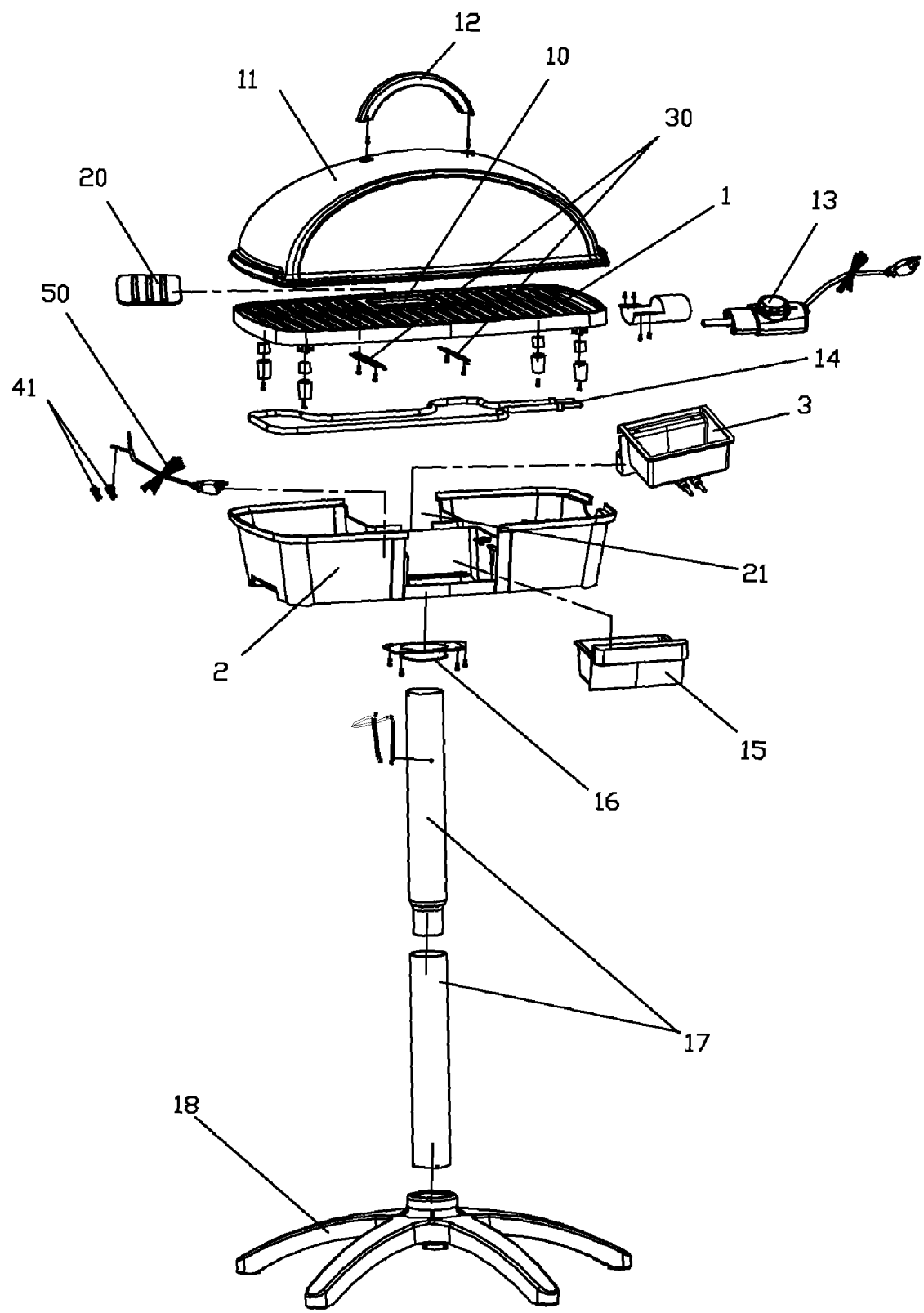
FIG. 3 is an exploded view of the present invention.
Figure 4:
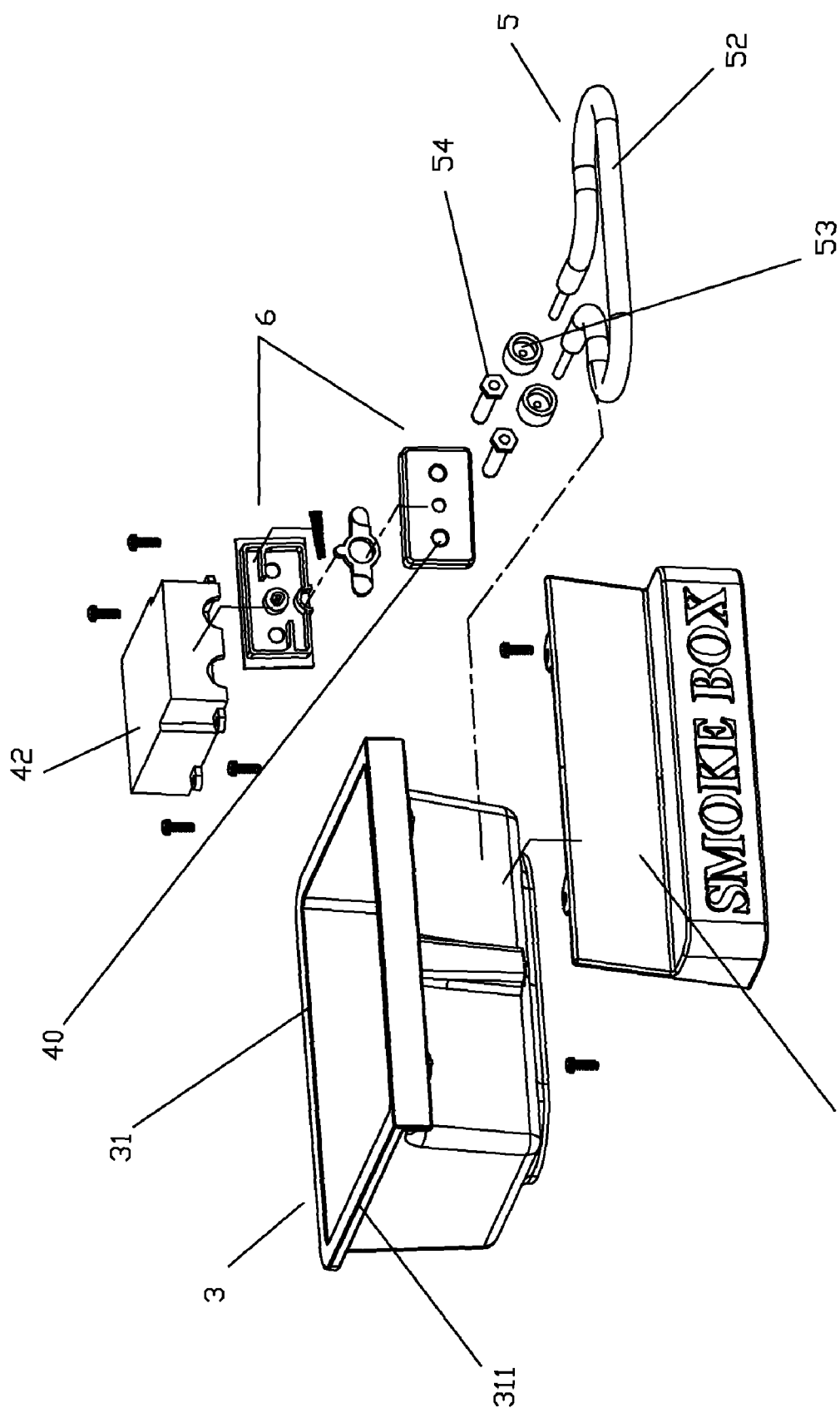
FIG. 4 is an exploded view of the smoker unit and the socket unit of the present invention.
Figure 5:
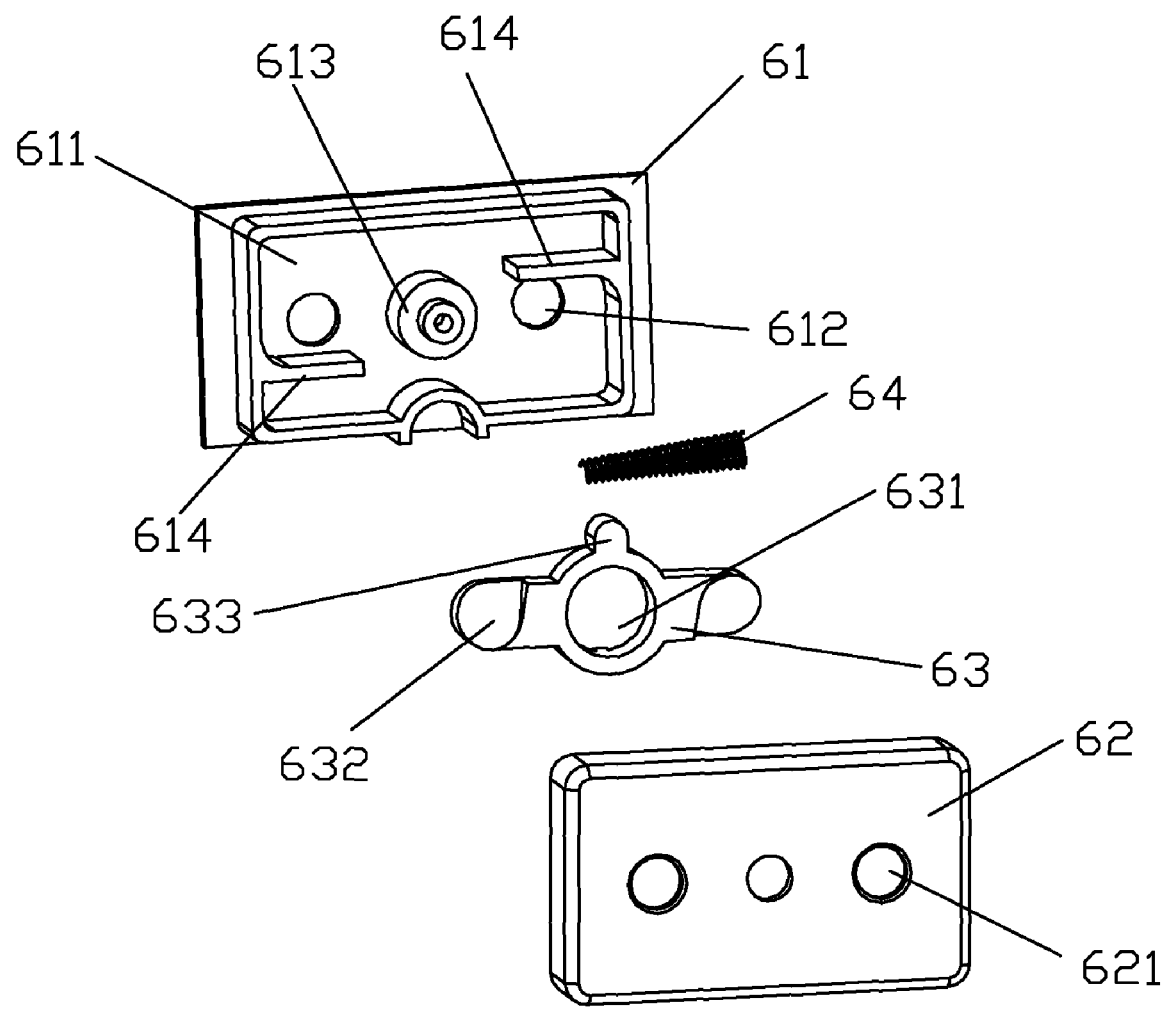
FIG. 5 is an exploded view of the water proof member of the present invention.
Figure 6:
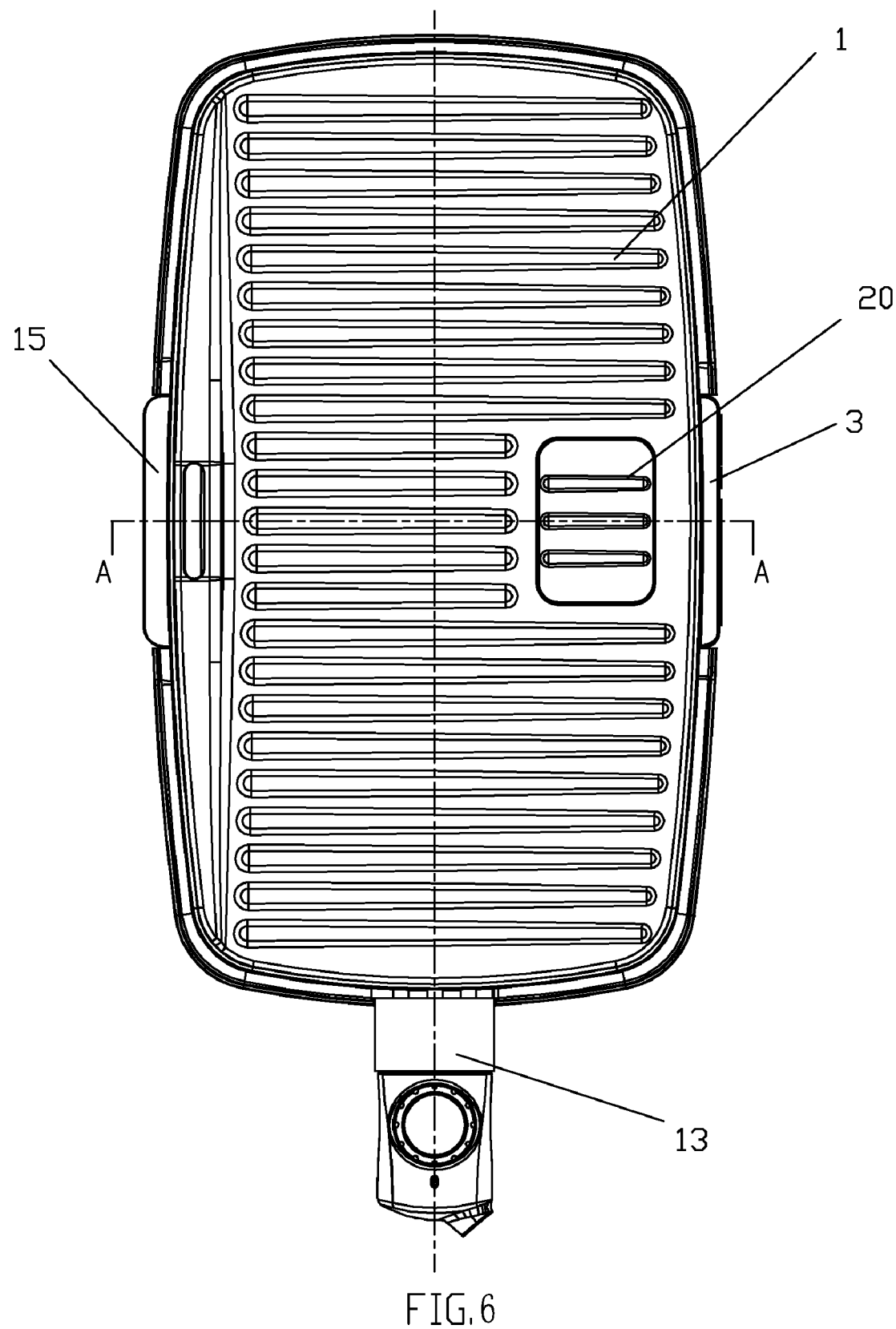
FIG. 6 is a partial view (including pan, body and component in the body) of the present invention.
Figure 7:
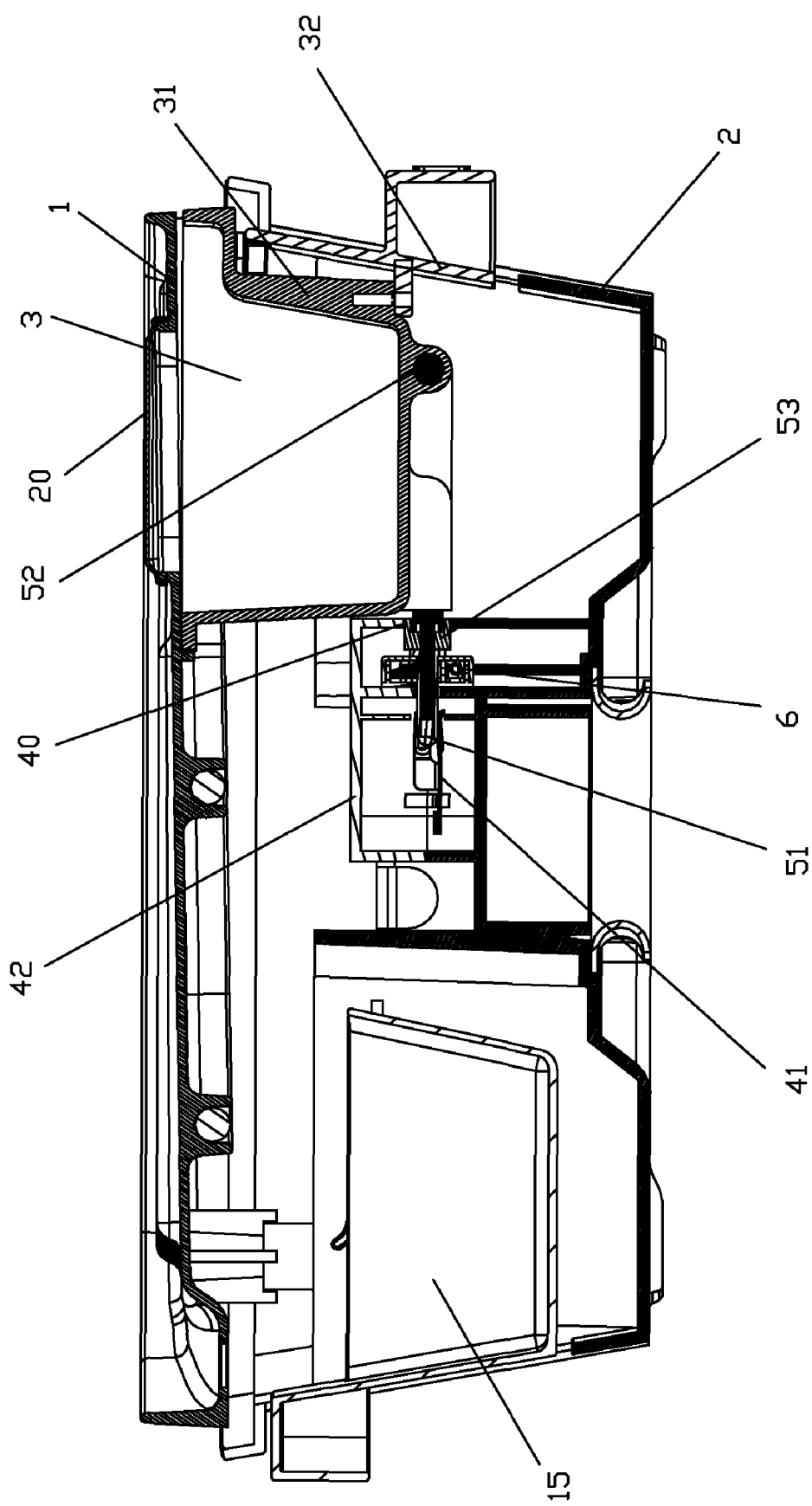
FIG. 7 is a sectional view taken along line A-A of FIG. 6.

Referring to the figures, the grill comprises a pan 1, a body 2, a grill lid 11, a handle 12, a temperature sensing device 13, a big electric heating tube 14, an oil box 15, a stator 16, a pipe 17, feet 18 and so on. These components are connected according to conventional methods well-known in the art, and are essentially the same as in a conventional grill.

The grill of the present invention further comprises a smoker unit 3 with an upward opening for containing wood chips/charcoal/spice, and a socket unit. The smoker unit 3 comprises a smoker box 31 and an electric heating member 5 with two plug terminals 51 mounted on the bottom of the smoker box 31 for heating the smoker box 31;

There is a side-opened recess 21 for containing the smoker box 3 on one side of the body 2. The pan over the recess has a passage 10 for the grilling cavity enclosed by the pan 1 and the cover 11 to be in communication with the interior cavity of the smoker box contained in the recess. A removable insulation lid 20 is mounted on the upper portion of the passage 10, wherein the upper portion of the passage 10 has a flange for the lid 20. Two sliding tracks 30 are mounted on the bottom of the pan 1 over the recess of the body, and each side of the smoker box 31 has a flange 311 corresponding to the sliding tracks respectively. The smoker unit 3 is inserted into the recess 21 of the body via the flanges 311 of the two sides sliding through the sliding track 30.

The socket unit is mounted in the body 2 in the inner side of the recess 21, and electrically connected to the power source (it can be a conductor) in the body 2. The socket unit has holes 40 for receiving the terminals 51.

The smoker unit 3 further comprises a handle 32 fixed on the rear side (opposite to the side that the smoker box facing the body when in assembly) of the smoker box. The electric heating member 5 comprises a heating tube 52, two silica caps 53 and two terminal pins 54. The electric heating tube 52 is installed inside the bottom portion of the smoker box 31, the needles of the electric heating tube 52 being arranged towards to the inner portion of the body. The two silica caps 53 are mounted on the two ends of the electric heating tube 52 respectively, and the two terminal pins 54 are mounted on the two needles of the electric heating tube 54. The terminal pins 54 and the needles of the heating tube 52 form the plug terminals 51. The socket unit comprises a water proof member 6, two speaker terminals 41, and a socket lid 42. The water proof member 6 has holes for passing through the two plug terminals 51. The body has a slot (not shown in the figures) for inserting the water proof member 6 and the two speaker terminals 41, along the moving direction of the plug terminals 51 when inserting into the body. The water proof member 6 is located on the front portion of the slot and the speaker terminals 41 are located on the rear portion of the slot, the openings of the two speaker terminals 41 being arranged towards the two holes of the water proof member 6 respectively. The holes of the water proof member 6 and the openings of the speaker terminals 41 form the holes 40 of the socket unit, and the socket lid 42 are mounted on the top of the water proof member 6 and the two speaker terminals 41 and are fixed on the body 2. The water proof member comprises a water proof base 61, a water proof cover 62, a bar 63 and a spring 64, wherein the water proof base 61 has a recess 611 for containing the bar, the water proof lid 62 is fixed with the water proof base 61 and cover the recess 611 of the water proof base. There are two holes 612 on the water proof base 61 and two corresponding holes 621 on the water proof lid 62, and these holes are in communication with the recess. The holes 612 and the holes 621 form the inserting holes of the water proof member 6, wherein there is a round protrusion 613 in the middle of the recess of the water proof base. The bar 63 sleeves on protrusion 613 of the water proof base via the hole 631 and can rotate relative to the water proof base 61. The bar 63 has two wings 632 which can bar between the holes of the water proof lid and the corresponding holes of the base in the recess, and there are two ribs extending from the side wall to the inner side of the recess of the water proof base. The ribs can prevent the bar 63 from rotating anticlockwise, and the bar has a protrusion 633 towards up in the middle. A spring 64 is installed in the cavity defined by one rib 614 and the wall of the water proof base, the two ends of the spring 64 propping up between the protrusion 633 of the bar and the side wall of the recess of the water proof base. The two wings 632 have ramps respectively; and the sliding track is a flexible support piece.

The grill with removable smoker unit of the present invention has a smoking function compared with conventional prior art grills. When the heating device of the smoker box is connected to the body, the power from the socket will heat the charcoal/spice in the smoker box 31 to produce smoke, and the food in the closed space between the pan and the cover will be smoked. The smoker box 31 is for containing the wood chips/charcoal/spice; the handle 32 fixed on the smoker box is for the smoking box 31 to be inserted into or removed from the body, and is for insulation function. The electric heating tube 52 provides heating, while the silicone caps 53 mounted on the two opening of the electric heating tube provides for insulation. As part of the plug terminal 51, the terminal pin 54 the electricity to the electric heating tube 52. The water proof cover and the water proof base cooperate with each other. The bar 63 is for water proofing and prevents the sundries from falling into the holes to affect the insertion of the plug terminal 51. The spring 64 is for repositioning the bar 63; the speaker terminals 41 is for connecting to the power supply such as a conductor 50, the speaker terminals 41 cooperate with the terminal pins 54 for introduction; the flexible pieces are used as sliding tracks 30 for the position and guiding of the smoker box 31.

In use, the smoker unit 3 is inserted into the recess 21 via flanges 311 of the box sliding along the sliding track 30. After reaching the predetermined position, the two flanges of the box 31 will be positioned by the flexible pieces. While the smoker unit 3 is being inserted into the recess 21, the plug terminal 51 of the smoker box will insert into the holes 40 of the socket unit. When the plug terminal 51 of the smoker unit inserts into the water proof member, the plug terminal 51 will extrude the ramps of the two wings 632 of the bar to let the bar 63 rotate in clockwise, then the protrusion 613 of the bar will extrude the spring 64. When the bar 63 rotates to make the holes 612 of the water proof base 61 to be in communication with the holes 621 of the water proof lid 62, the plug terminal 51 will pass through the holes of the water proof member 6 and further insert into the opening of the speaker terminal 41 in the rear side of the water proof member. When the smoker unit 3 is inserted entirely in the recess 21 of the body, the plug terminal 51 will entirely insert in the speaker terminal 41 as well, thus providing an electric connection to the electric heating tube 52 via the speaker terminal 41 and plug terminal 51. Then the electric heating tube 52 begins to heat and the wood chips/charcoal/spice in the box will be heated to produce smoke which will enter into the grilling cavity between the pan and the cover through the hole of the pan, whereby the food is smoked to have a golden color and have a smoke taste.

When the food does not need to be smoked, the smoker unit 3 can be drawn out from the recess 21 of the body by pulling the handle 32, wherein the plug terminal 51 of the smoker unit will also be dissociated from the hole 40 of the socket unit. When the socket terminals 41 is removed from the holes of the water proof member 6, the bar 63 will rotate counterclockwise in the action of the spring till the two wings 632 of the bar are stopped by the ribs 614 of the water proof base. After repositioning, the two wings 632 of the bar will re-block between the hole 612 of the water proof base 61 and the holes 621 of the water proof cover 62, thus preventing water or the other sundries from dropping into the holes. The insulation lid 20 should be covered on the pan 1 to prevent the outer air from entering into the pan 1 to affect the grilling of the food.

Having thus described exemplary embodiments of the present invention, it should be noted by those skilled in the art that the disclosures above are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A grill, comprising:
 a body having a recess portion on one side;
 a grill lid;
 a pan located on the top of the recess portion, wherein the pan comprises a first connecting device disposed on the bottom of the pan;
 a smoker unit comprising a smoker box and an electric heating unit disposed on the bottom of the smoker box, wherein the electric heating unit comprises a plug terminal member, wherein the smoker box comprises a second connecting device which can be connected with the first connecting device, and the smoker unit is integrated into the recess portion by the connection of the first and second connecting devices;
 and a socket unit disposed on the inner portion of the recess portion, wherein the socket unit comprises the pan and the lid, forming a cavity, wherein a passage is formed through the pan, cavity and the smoker box.

2. The grill according to claim 1, wherein the passage has a removable insulation lid disposed on its upper end.

3. The grill according to claim 1, wherein the first connecting device comprises a sliding-track unit, the second connecting device comprises a flange unit, and the smoker unit is integrated into the recess portion by sliding the flange unit on the sliding-track unit.

4. The grill according to claim 3, wherein the sliding-track unit comprises a plurality of flexible support pieces.

5. The grill according to claim 1, wherein the smoker unit further comprises a handle fixed on the rear side of the smoker box, wherein the rear side is opposite to the side of the smoker box facing the body in assembly.

6. The grill according to claim 1, wherein the electric heating unit comprises at least an electric heating tube with needles, two silica caps, and two terminal pins, wherein the electric heating tube is installed inside the bottom portion of the smoker box, the needles of the electric heating tube are arranged towards the inner portion of the body, the silica caps are mounted on the two ends of the electric heating tube respectively, and the two terminal pins are mounted on the needles.

7. The grill according to claim 1, wherein the socket unit comprises a waterproof member, a speaker terminal member, and a socket lid, wherein the water proof member has an aperture member for passing through the plug terminal member, the body has a slot member for inserting the water proof member and the speaker terminal member respectively, along the insertion direction of the plug terminal member, wherein the water proof member is located on the front portion of the slot member and the speaker terminal member is located on the rear portion of the slot member, and the speaker terminal member is arranged towards the aperture member, with the socket lid covering the water proof member and the speaker terminal member, wherein the socket lid is fixedly connected with the body.

8. The grill according to claim 7, wherein the water proof member comprises a water proof base, a water proof lid, a bar, and a spring, wherein the water proof base has a recess for containing the bar, the water proof lid is fixedly connected with the water proof base and covers the recess of the water proof base, wherein the water proof base and the water proof lid respectively comprises two channels connected to the recess of the water proof base, wherein the water proof base comprises a protrusion unit disposed in the central portion of the recess of the water proof base, the bar is mounted on the protrusion unit and can rotate around the water proof base, wherein the bar comprises two wings which can cut off the channels, wherein the recess of the water proof base further comprises a rib unit extending from the inner side wall of the recess for preventing counterclockwise rotation of the bar, wherein the bar further comprises a protrusion disposed in its central portion, the spring is mounted in the cavity formed by rib unit and the inner wall of the recess of the water proof base, the two ends of the spring propping up between the protrusion of the bar and the inner wall of the recess of the water proof base, and each of the two wings having a ramp respectively.

* * * * *